United States Patent [19]

Tamura

[11] Patent Number: 5,412,178
[45] Date of Patent: May 2, 1995

[54] IRON-TIP TEMPERATURE DETECTOR OF ELECTRIC SOLDERING IRON

[75] Inventor: Toshiharu Tamura, Tomobe, Japan

[73] Assignee: Japan Bonkote Company Limited, Ibaraki, Japan

[21] Appl. No.: 216,866

[22] Filed: Mar. 24, 1994

[30] Foreign Application Priority Data

Jul. 23, 1993 [JP] Japan .................. 5-203001

[51] Int. Cl.⁶ .......................... H05B 1/00; H05B 3/42
[52] U.S. Cl. ........................... 219/241; 228/51; 126/236
[58] Field of Search ............. 219/241, 242, 230, 229, 219/231, 236, 240, 85.16; 228/51–55; 126/236

[56] References Cited

U.S. PATENT DOCUMENTS

| | | |
|---|---|---|
| 5,062,564 | 11/1991 | Urban . |
| 5,297,716 | 3/1994 | Smith et al. .................. 219/241 |

FOREIGN PATENT DOCUMENTS

| | | | |
|---|---|---|---|
| 337065 | 10/1989 | European Pat. Off. ........... 219/241 |
| 2708967 | 9/1978 | Germany ............................ 219/241 |
| 219701 | 3/1985 | Germany ............................ 219/241 |
| 56-54313 | 5/1981 | Japan .................................. 219/241 |
| 4-288966 | 10/1992 | Japan ...................................... 228/51 |
| 7713629 | 6/1979 | Netherlands ........................ 219/241 |
| 1507033 | 4/1978 | United Kingdom ................ 219/241 |
| 2148676 | 5/1985 | United Kingdom ................ 219/241 |
| 260032 | 12/1969 | U.S.S.R. ............................. 219/241 |

*Primary Examiner*—John A. Jeffery
*Attorney, Agent, or Firm*—Wenderoth, Lind & Ponack

[57] ABSTRACT

A contact point of a thermocouple sensor is welded to the nose of an iron tip of an electric soldering iron, and sensor wires of the sensor are laid along the surface of the iron tip through a groove to a columnar base of the iron tip. The columnar base of the iron tip is covered, together with the sensor wires situated on its outer surface, with a heater cover. A heater is fitted in an axial bore in the base of the iron tip. The temperature of the iron tip is directly detected by the thermocouple sensor, and on the basis of the detection and a reference temperature, an arithmetic processing is carried out by a signal processor of the temperature controller. Such arithmetic processing is used by the temperature controller to control the electric power supplied to the heater to cause the temperature of the iron tip to coincide with the reference temperature.

10 Claims, 3 Drawing Sheets

IRON-TIP TEMPERATURE DETECTOR OF ELECTRIC SOLDERING IRON

BACKGROUND OF THE INVENTION

1. Field of the Invention

The present invention is related to the iron-tip temperature detector of an electric soldering iron, which detects the current temperature of the iron tip of the soldering iron and issues a signal indicative of such temperature to a temperature controller, so that the temperature of the iron tip can be regulated to a desired value.

2. Description of the Related Art

In order to properly solder electric wiring using an electric soldering iron, it is necessary, in particular, to set and maintain properly the temperature of the iron tip of the soldering iron.

Therefore, electric soldering irons have been provided with a temperature controller that can adjust the temperature of the iron tip.

Such an electric soldering iron is shown in FIG. 7.

In this electric soldering iron 1, a cooling wheel 4 is securely fixed to the tip of grip 2 by way of radiating nut 3. A heater cover 6 covers the iron tip 5 except at the nose of the iron tip 5. A cover nut 7 holds the rear end of iron tip 5 and is screwed onto a male thread formed around the periphery of the central protruding part of the cooling wheel 4.

The iron tip 5 is hollow from the end thereof adjacent grip 2 to near the nose of the iron tip 5. A heater 8 shown in FIG. 6 is inserted in the iron tip. Further, a thermocouple sensor 10, which constitutes the temperature detector, is disposed in the heater 8. That is, the thermocouple sensor 10 is, as shown in FIG. 6, inserted into the heater proper 9 along its axial center, and contact point part 11, which is the recuperator of the sensor, is embedded in a ceramic element 12 provided at the nose of the heater proper 9.

In the conventional electric soldering iron described above, soldering is carried out by supplying electric power to the heater 8, thereby heating the iron tip 5. When using such an electric soldering iron 1, the following temperature regulating process is carried out.

Because contact point part 11 of the thermocouple sensor 10 is fixed securely (by being embedded in ceramic element 12) to the nose of heater 8, the temperature of heater 8 is detected by the thermocouple sensor 10. The detected temperature is converted into a value representing the temperature of iron tip 5 by the temperature controller, and the converted temperature is compared with a reference temperature, namely, the desired iron tip temperature which is preestablished based on the type of soldering. If the converted temperature is lower than the reference temperature, or vice versa, the temperature of iron tip 5 is adjusted by controlling the quantity of the electric power supplied to heater 8.

Therefore, when controlling the temperature of the iron tip of a conventional electric soldering iron 1, the temperature at the iron tip 5 is not directly detected. Rather, the temperature of the heater 8, which is a heating means, is detected, and from the temperature of this heater 8, the temperature of the iron tip 5 is inferred. Then on the basis of the inferred value and said reference temperature, the electric power supplied to heater 8 is adjusted, thereby controlling the temperature of iron tip 5. Because the inferred value may not be the actual temperature of the tip, the tip may be regulated to an improper temperature.

In other words, when using the electric soldering iron 1, the temperature of the iron tip 5 and that of heater 8 maintain nearly a constant relationship when the electric soldering iron is idle, i.e. prior to use. Hence, it is possible to infer a comparatively correct iron-tip temperature from the temperature of heater 8, and the iron-tip temperature can be adjusted in a comparatively correct manner. However, when the actual soldering operation is commenced, the iron tip 5 is cooled by solder and parts to be soldered, and a certain lag occurs before such a lowered iron-tip temperature can be reflected by the heater. During such an actual operation, therefore, the temperature of the iron tip 5 fails to maintain a constant relationship with the temperature of heater 8. Naturally, the temperature, which has been deduced on the basis of the temperature of the heater 8 does not coincide with the actual temperature of the iron tip 5, thereby making it impossible to regulate the temperature of the iron tip 5 to a correct value.

More specifically, a drop in the iron-tip temperature due to solder and parts to be soldered will not be immediately reflected by the temperature of the heater. Therefore, only when the temperature of the iron tip 5 drops considerably, which occurs only after a comparatively long time with respect to the overall soldering operation, will the temperature of the heater 8 drop. Only when the temperature drop is detected will the control system operate to compensate for the temperature drop. Therefore, it is impossible to detect the iron-tip temperature correctly in real time when the iron-tip temperature drops, thereby causing an inferior response by the control system which can result in unsatisfactory soldering.

In particular, because soldering electric parts requires high performance nowadays, it is necessary to adjust the iron-tip temperature of the electric soldering iron with high accuracy in order to solder properly without damaging the electric parts. From this viewpoint, the iron-tip temperature detector of the conventional electric soldering iron poses serious problems.

SUMMARY OF THE INVENTION

Therefore, the first object of the present invention is to provide an iron-tip temperature detector of an electric soldering iron, which can detect the iron-tip temperature in real time in order that the temperature of the iron tip of the electric soldering iron will be controlled correctly with good response.

The second object of the present invention is to protect the temperature sensor, which is provided at the iron tip, from external forces.

Another object of the present invention is to provide an iron-tip temperature detector of an electric soldering iron, which issues the temperature of the iron tip to the temperature controller (attached to the electric soldering iron) and which controls the temperature of the iron tip according to a preestablished reference temperature, in real time.

To achieve these objects, the iron-tip temperature detector includes a temperature sensor fitted near the nose of the iron tip for detecting the iron-tip temperature.

The temperature controller is of a conventional type used in already existing electric soldering irons.

The temperature sensor may be of various types which are suitable for detecting the temperature range of molten solder and which can withstand such high temperatures. From this point of view, a thermocouple is preferably used for the temperature sensor.

Further, the temperature sensor is protected from external physical forces by a heat-resistant protective material, such as a piece of metallic wire.

The end of the temperature sensor can also be located just in front of the nose of the iron tip in a dent, if there is any room for forming the dent in the nose. Through this method, it is possible to protect the temperature sensor against collision with various exterior parts.

Further, when the temperature sensor is a thermocouple sensor, a groove may be formed lengthwise in the iron tip and the thermocouple sensor is laid in such groove.

The present invention operates in the following way.

The iron tip is heated by supplying electric power to a heater to generate heat, thereby facilitating the soldering operation. At this time, the temperate controller adjusts the electric power supplied to the heater on the basis on the iron-tip temperature detected by the temperature detector and the reference temperature set by the user, and the iron-tip temperature is controlled so that it will agree with the reference temperature.

In the present invention, the temperature sensor, for instance, the thermocouple sensor, which detects the iron-tip temperature, is provided near the nose of the iron tip. Therefore, the iron-tip temperature can be directly detected by the temperature sensor, thereby making it possible to correctly detect the true iron-tip temperature. Then, the temperature controller processes the actual iron-tip temperature and the reference temperature, and depending upon the result of this processing, the electric power supplied to the heater is controlled. In this way, the iron-tip temperature is properly adjusted with good response and correctly not only during idling but also during the actual soldering operation. Further, since the present invention can directly detect the iron-tip temperature, arithmetic processing in which the iron-tip temperature is calculated from the heater temperature is unnecessary.

Further, when the temperature sensor is protected using heat-resistant protective material, even if the temperature sensor, such as the thermocouple sensor, is brought into contact with the surrounding material or the parts to be soldered during the actual soldering operation, the heat-resistant material protects the sensor to prevent it from being damaged. Therefore, it is possible to carry out the soldering operation without worrying about damaging the temperature sensor. As a result, the present invention can improve one's ability to solder.

Further, when the end of the temperature sensor is located in the dent formed near the nose of the iron tip, the temperature sensor does not protrude from the iron tip, thereby ensuring its protection. It is proper to use this feature when the size of the iron tip allows.

Similarly, when the thermocouple sensor is laid in the groove extend axially in the outer surface of the iron tip, the protection of the thermocouple sensor is ensured.

DETAILED DESCRIPTION OF THE PREFERRED EMBODIMENTS

In the following, preferred embodiments of the present invention are described in detail with reference to the attached drawings.

Figure 1:
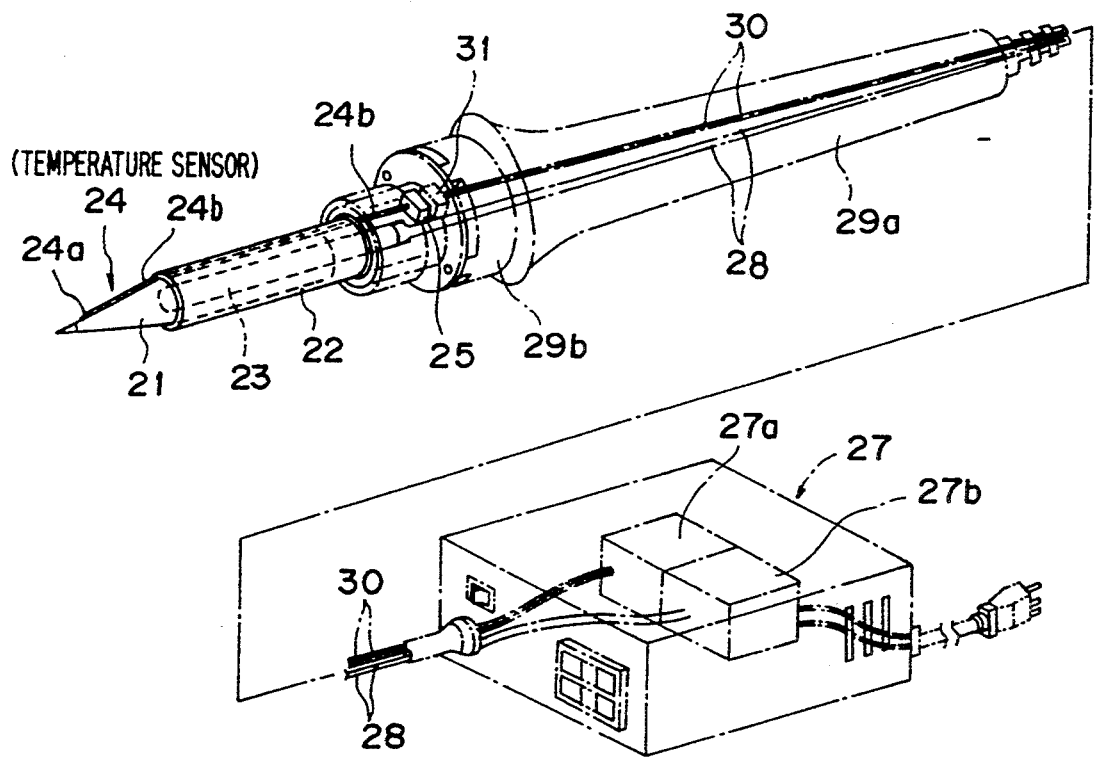
FIG. 1 is a perspective view of an electric soldering iron to which the present invention, shown by solid lines, is applied.
Figure 2:
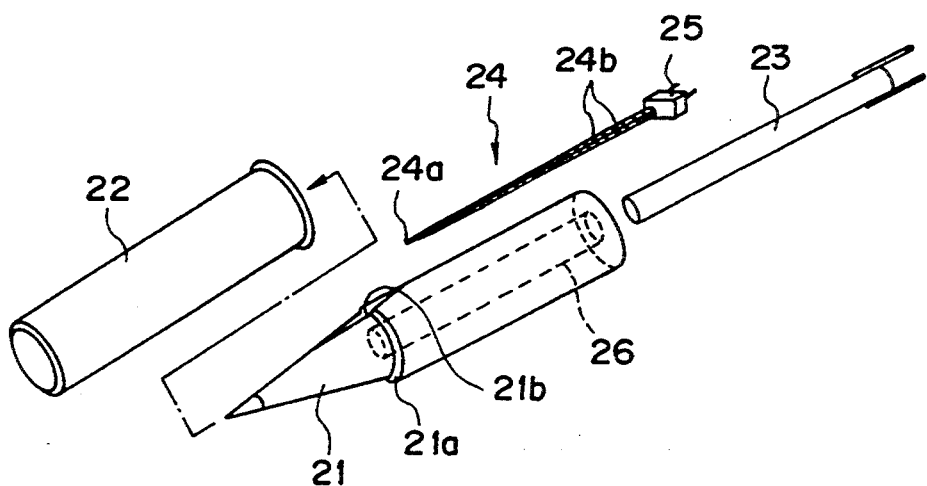
FIG. 2 is an exploded view of a first embodiment of the nose structure of the electric soldering iron according to the present invention.
Figure 3:
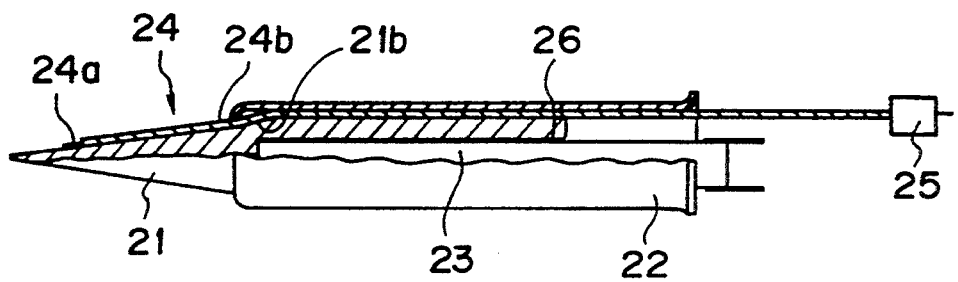
FIG. 3 is a longitudinal view, partially in section, of the nose structure of the electric soldering iron of the present invention.

In FIGS. 1 to 3, an iron tip 21 is provided at the end of the electric soldering iron. Iron tip 21 has a nearly conical nose. Its base has a columnar shape, and the columnar base is covered with a cylindrical heater cover 22. Further, iron tip 21 has a step 21a, as shown in FIG. 2, at the boundary between the conical nose and columnar base. The base of iron tip 21 is, as mentioned earlier, covered with the cylindrical heater cover 22. The nose of the iron tip 21 is inserted through the rear end of heater cover 22 until the step 21a engages a small-diameter part of the tip of heater cover 22, whereby the iron tip 21 is prevented from passing through the cover 22.

A bore 26 extends through the center of the base end of iron tip 21 and opens at the rear end of the base, as shown in FIG. 3. A heater 23 is inserted into this bore 26. As shown in FIG. 1, the heater 23 is energized by a power line 28 connected to a temperature controller 27.

As shown in FIGS. 1 to 3, the iron tip 21 is provided with a thermocouple sensor 24, as a temperature sensor, extending lengthwise on the outer surface of the iron tip 21. A contact point part 24a, which is the heat-sending part of the thermocouple sensor 24, is fixed securely to the surface of the nose of iron tip 21, and portions of the sensor 24 lie in a groove 21b extending through the step 21a (that is the boundary between the conical nose and columnar base) in a lengthwise direction of the iron tip 21.

The parts of the sensor wires 24b of said thermocouple 24, which lie along the columnar base of the iron tip 21, are covered with the heater cover 22.

The iron-tip temperature detector of the electric soldering iron is assembled in the following way:

the contact-point part 24a of the thermocouple sensor 24 is welded to outer surface of the nose of the iron tip 21, the sensor wires 24b are laid along the outer surface of the iron tip 21 towards the rear end of the base, while being fitted in groove 21b, and thereafter a portion of these wires 24b is covered by the heater cover 22.

Further, it is needless to say that iron tip 21 must be electrically insulated from the power supply circuit and other circuits in order to achieve correct temperature detection and to protect the temperature controller 27 which is connected to the thermocouple sensor 24.

Further, the surfaces of sensor wires 24b of the thermocouple 24 are covered with electrically insulative material, but after the wires are laid along the iron tip 21 and before they are covered by the heater cover 22, they should be coated with a xylene-type of coating material to prevent the insulative covering material from becoming loose.

The sensor wires 24b of the thermocouple sensor 24 are connected to a sensor plug 25, and this sensor plug 25 is connected to a signal processor 27a of temperature controller 27 via a jack 31 to which the plug 25 is detachably connected and signal wires 30 which pass inside of grip 29a and radiating nut 29b of the electric soldering iron as shown in FIG. 1. In this way, the temperature signal detected by thermocouple sensor 24 is transmitted to the signal processor 27a of temperature controller 7 through the signal wires 30.

Further, a power line 28 of the heater 23 is connected to controller 27b of temperature controller 27 as mentioned earlier.

The signal processor 27a of the temperature controller 27 arithmetically processes the iron-tip temperature and the reference temperature set by the user. Based on this processing the controller 27b controls the amount of electric power supplied to the heater 23 and makes adjustments to make the temperature of the iron tip 21 coincide with the reference temperature. The temperature controller itself is known. In the present invention, however, the iron-tip temperature is directly detected and, therefore, the signal processor 27a of the temperature controller 27 does not convert the heater temperature to a temperature representative of the iron-tip temperature.

Rather, the signal processor 27a carries out arithmetic processing on the basis of the true iron-tip temperature detected by the thermocouple sensor 24 and the reference temperature set by the user, and on the basis of such processing, the controller 27b controls the electric power supplied to heater 23, thereby adjusting the temperature of the iron tip 21 until it coincides with the reference temperature. In short, if the iron-tip temperature is lower than the reference temperature, the electric power is increased until the iron-tip temperature becomes higher and coincides with the reference temperature. In the reverse case, the electric power supplied is decreased.

Therefore, the temperature of the iron tip 21, in particular, the temperature of the nose of the iron tip 21, is adjusted in real time so that the soldering temperature required when soldering precision electrical parts is correctly established.

Figure 4:
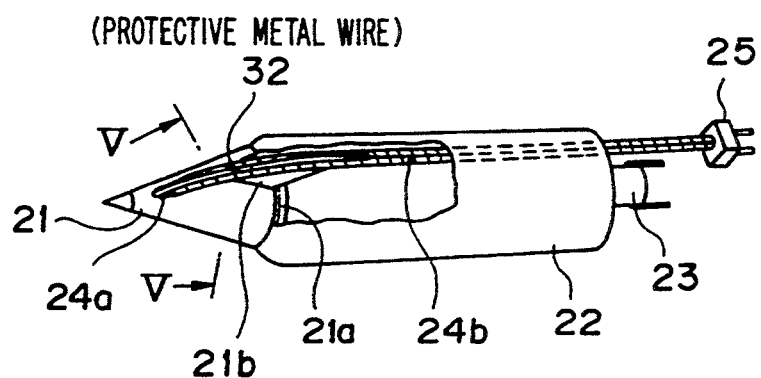
FIG. 4 is a perspective view, partially broken away, of another embodiment of nose structure of an electric soldering iron according to the present invention.
Figure 5:
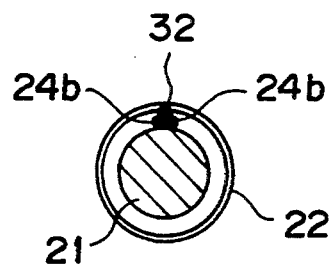
FIG. 5 is a sectional view taken along line V—V of FIG. 4.
Figure 6:
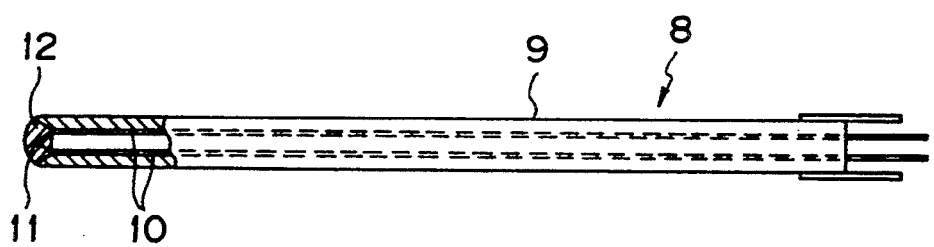
FIG. 6 is a longitudinal view, partially in section, of the heater into which the thermocouple sensor is inserted in the present invention.
Figure 7:
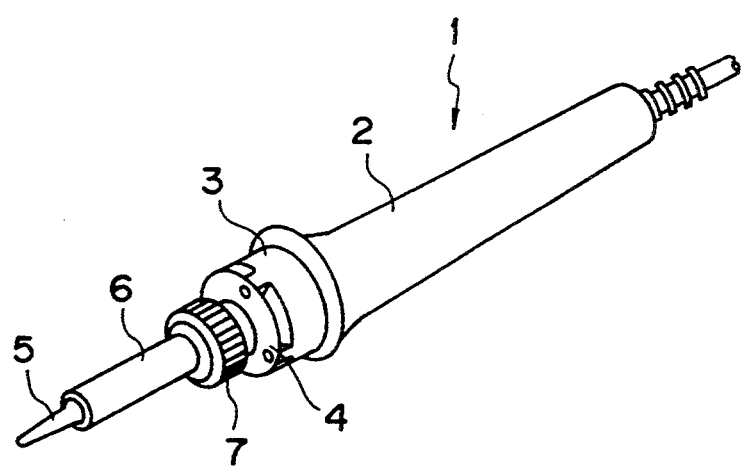
FIG. 7 is a perspective view of a conventional electric soldering iron.

FIGS. 4 and 5 show another preferred embodiment of the iron-tip temperature detector of the electric soldering iron of the present invention.

This preferred embodiment is different from the first embodiment only in that a metallic wire 32 as a heat-resistant protective material is provided on thermocouple sensor 24. Therefore, the elements which are the same as those in the first preferred embodiment are designated by the same reference numerals.

As shown in FIGS. 4 and 5, the electric soldering iron of this preferred embodiment has an iron tip 21, a contact part 24a of a thermocouple sensor 24 fixed securely to the nose of tip 21 by welding as in the first preferred embodiment, and sensor wires 24b of the thermocouple sensor 24 extending towards the base of the tip while partly located on the outer surface of iron tip 21 and in the groove 21b in the iron tip 21 again, as in the first preferred embodiment. The sensor wires 24b, especially those portions which are not covered by heater cover 22, are coated beforehand with the coating agent, which is highly heat-resistant and can withstand, for instance, 650° C. maximum, in order to prevent the insulating covering material from becoming loose.

A single metallic wire 32, which is the heat-resistant protective material, is provided on the sensor wires 24b, as shown in FIGS. 4 and 5. The metallic wire 32 is a steel wire, nickel wire, etc. The end of the metallic wire 32 is fixed securely to the iron tip 21.

The electric soldering iron of this preferred embodiment has the following advantages. Even when the iron tip 21, in particular, the portion of the iron tip where sensor wires 24b of thermocouple sensor 24 are located, comes into strong contact with surrounding parts, etc. during soldering, the parts, etc. come into direct contact with the metallic wire 32 and are prevented from touching the sensor wires 24b of the thermocouple sensor 24. As a result, the integrity of the performance of the thermocouple sensor 24 maintained even if the surrounding parts, etc. destroy the covering of the sensor wires 24b of the thermocouple sensor 24 during soldering, and the user can solder without worrying about contacting the soldering iron with surrounding parts. Consequently, the soldering operation is facilitated.

In the preferred embodiments, a thermocouple sensor 24 is used as the temperature sensor but needless to say the present invention is not so limited.

Further, in the latter preferred embodiment, a single metallic wire is fixed securely to sensor wires 24b as a heat-resistant protective material, but again, the present invention is not so limited.

That is, various changes and modifications will become apparent to those of ordinary skill in the art. Such changes and modifications are seen to be within the true spirit and scope of the invention as defined by the appended claims.

I claim:

1. Structure for use in soldering comprising: a soldering tip having a base and a conical nose extending from said base, a temperature sensor extending lengthwise along the outer surface of said soldering tip, said temperature sensor having a terminal end adjacent an end of said nose remote from said base, and heat-resistant material protecting said temperature sensor, said heat-resistant material comprising metal wire.

2. Structure for use in soldering as claimed in claim 1, wherein said temperature sensor comprises a thermocouple.

3. Structure for use in soldering as claimed in claim 2, wherein said tip defines a groove at the outer surface thereof, and said temperature sensor extends in said groove.

4. Structure for use in soldering as claimed in claim 3, wherein the base of said tip is columnar, the tip has a step at the boundary between the columnar base and the conical nose, and said groove extends through said step in a lengthwise direction of said tip.

5. Structure for use in soldering as claimed in claim 4, and further comprising a jacket surrounding the columnar base, said jacket having a flange at one end thereof, said flange engaging the step of said soldering tip.

6. Structure for use in soldering as claimed in claim 4, wherein the base has a bore extending axially therethrough and terminating at said conical nose.

7. Structure for use in soldering as claimed in claim 6, and further comprising a rod-shaped heater fitted in said bore.

8. Structure for use in soldering as claimed in claim 1, wherein the material protecting said temperature sensor consists of a single metal wire extending lengthwise along said thermocouple.

9. Structure for use in soldering as claimed in claim 1, wherein the base has a bore extending axially therethrough and terminating at said conical nose.

10. Structure for use in soldering as claimed in claim 9, and further comprising a rod-shaped heater fitted in said bore.

* * * * *